March 2, 1971 W. B. McCARDELL 3,566,652
METHOD AND APPARATUS FOR PROVIDING A TOOTHED-FORMING RACK
Filed Aug. 23, 1968
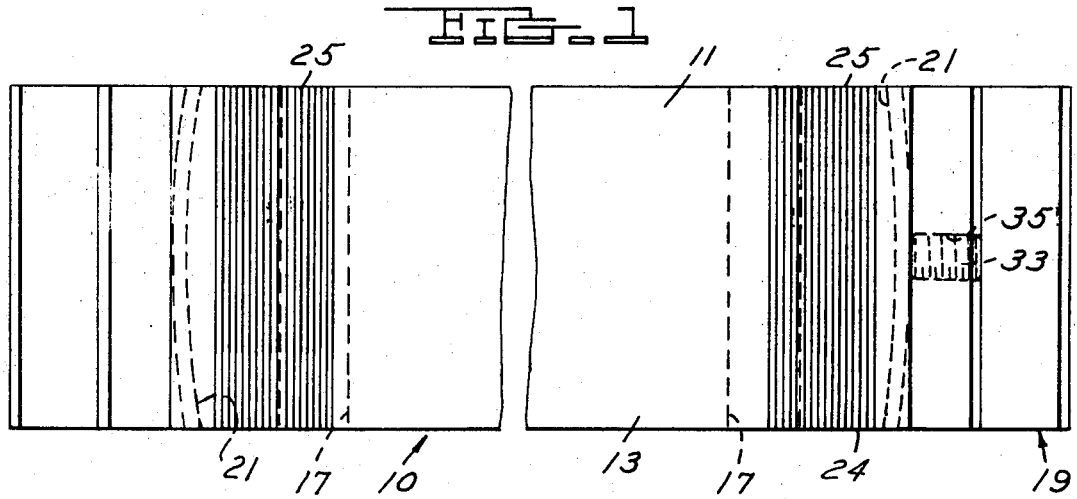
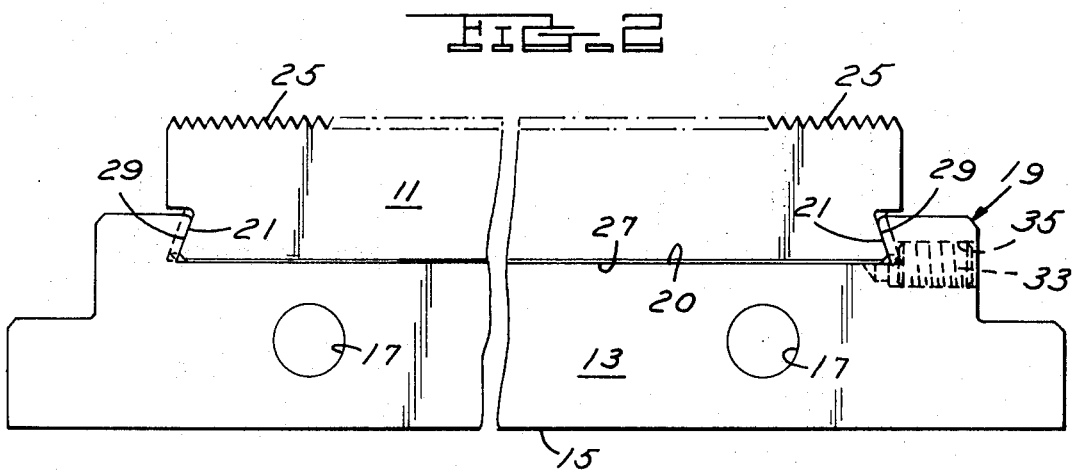
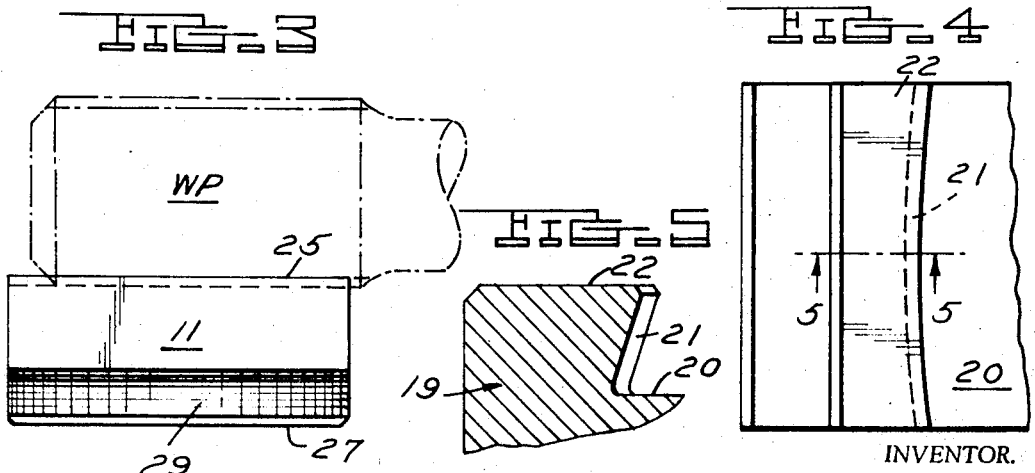
INVENTOR.
WILLARD B. McCARDELL
BY
James H. Bower
ATTORNEY United States Patent Office 3,566,652
Patented Mar. 2, 1971

3,566,652
METHOD AND APPARATUS FOR PROVIDING A TOOTHED-FORMING RACK
Willard B. McCardell, Royal Oak, Mich., assignor to Michigan Tool Company, Detroit, Mich.
Filed Aug. 23, 1968, Ser. No. 754,880
Int. Cl. B21h 3/06
U.S. Cl. 72—88                              1 Claim

ABSTRACT OF THE DISCLOSURE

A means for assembling and retaining a toothed forming rack on a base member.

BACKGROUND OF THE INVENTION

(1) Field of the invention

The invention relates to a toothed forming rack for gear forming machines of the type shown in Pelphrey Patent No. 2,930,877, issued Mar. 29, 1960 for Method of Forming Toothed Elements; Pelphrey Patent No. 2,994,237 issued Aug. 1, 1961 for Tooth Forming Tool; Drader Patent No. 2,995,964, issued Aug. 15, 1961 for Machine, Drader Patent No. 3,015,243 for Tool for Pressure Forming Toothed Elements, and McCardell Patent No. 3,121,352 issued Feb. 18, 1964 for Tooth Forming Method and Apparatus.

(2) Description of the prior art

It is known to have a rack or tooth forming tool for forming gear teeth on a workpiece such as disclosed in Drader Patent No. 3,015,243 issued Jan. 2, 1962 for a Tool for Pressure Forming Toothed Elements. The tooth forming tool or rack is adapted to slide longitudinally and form splines on the surface of a workpiece. The workpiece is supported by means which permit it to rotate freely on a fixed axis when urged to do so by the tooth forming tool or rack, it being understood that an upper tool or rack is substantially identical to the bottom tool or rack.

SUMMARY OF THE INVENTION

According to the present invention, the tooth forming tool or rack is mounted in a unique and novel way, such that the forming rack is never displaced and thus is held securely throughout its tooth forming operations. Furthermore, the forming rack is easily replaced when the teeth are worn.

BRIEF DESCRIPTION OF THE DRAWINGS

FIG. 1 shows a top view of the forming rack or tooth forming tool;
FIG. 2 shows a side elevational view of the toothed-forming rack;
FIG. 3 shows an end cross-sectional view with a workpiece;
FIG. 4 shows a top view of one end section of the rack; and
FIG. 5 shows a cross-sectional view of the end portion of the rack as taken along lines 5—5 of FIG. 4.

DESCRIPTION OF THE INVENTION

The tooth forming rack assembly indicated as 10, comprises a tooth forming rack 11 mounted on a holder 13.

The holder 13 includes a flat base 15 which rests on a machine work bed and fastened thereto by means of bolts (not shown) extending through bores 17 of the holder 13, to a back bar (not shown). The holder thus is adapted to slide longitudinally such as disclosed in the above cited patents.

The holder 13 includes an abutment means 19 at each end thereof, with the surface portion of the abutment means contacting the tooth forming rack 11 in the form of a partial-cone dovetail 21. That is, in the view shown in FIG. 5, the edge from the top surface 20 of the holder to the top surface 22 of the abutment means 19 forms an acute angle. A simulated circle having its axis centrally located along the longitudinal axis of the holder 13 generates an arc extending from sides 23 and 24, the height of which generates surface 21 as in a partial cone.

The tooth forming rack 11 includes a top surface providing teeth 25 thereon and a bottom surface 27, and further includes dovetail surface 29 undercut at each end thereof which matingly engages the surface 21 of the holder 13. The generated surface of dovetail surface 29 of tooth forming rack 11 is identical to the surface 21 of holder 13. Thus it is apparent that the surfaces 29, 21 are contacted abuttingly when in tooth forming operations. However, it is apparent that the holder 11 must be inserted in a particular fashion in that the rack 11 is twisted until surfaces 21, 29 are matingly contacted and then rack 11 is rotated into proper longitudinal alignment with holder 13.

To maintain proper positioning of rack 11 with holder 13, a cementing agent, such as an epoxy 31 is placed between surfaces 20 and 27 of holder 13 and rack 11 respectively. Thus, the proper method of assembly is to place the cementing agent, such as an epoxy 31 while it is still pliable and not yet set on the surface 20 of holder 13, then to place rack 11 on the epoxy filler 31 at an angle to the holder 13 and rotate same until longitudinally parallel to the holder 13. The surfaces 29, 21 at one end are metal to metal contacting surfaces by means of adjustment means 33 in bore 35 of holder 13 which upon movement thereof bears against the surface 29 of rack 11. Thus, rack 11 is securably fastened to the holder 13 by means of: (1) dovetail coned surfaces 29, 21; (2) cementing means such as an epoxy 31; and (3) adjustment means 33. This type of securing means allows a permanent fastening means for the rack 11, after alignment of the rack, and further allows for faster and easier removal and replacement thereof.

While certain specific constructions have been disclosed herein to illustrate the invention, it will be understood that other embodiments are within the spirit and scope of the invention as set forth in the claims set forth herein:

What is claimed is:
1. A tool for pressure forming teeth on the periphery of a cylindrical workpiece, comprising:
 (a) a longitudinally extending base member having a flat surface portion with abutment means on each end of said base member extending above said flat surface portion;
 (b) one of said abutment means comprises a partial-cone dovetail surface portion facing said flat surface portion;
 (c) the other of said abutment means comprising:
  (1) a partial-cone dovetail surface portion facing said flat surface portion;

(2) a threaded bore extending longitudinally through said abutment means; and
(3) threaded adjustment means extending in said bore;
(d) a longitudinally extending tooth forming rack, said tooth forming rack comprising:
   (1) a flat bottom surface portion;
   (2) a toothed top surface portion; and
   (3) partial-cone dovetail surface portions at each end thereof adapted to abut said partial-cone dovetail surface portions on each of said abutment means; and
(e) cementing means interposed between said flat surface portion of said base member and said flat bottom surface portion of said tooth forming rack; whereby said tooth forming rack is adapted to be dovetailed to said base member, and secured thereto by said adjustment means in order for said cementing means to set and harden.

References Cited

UNITED STATES PATENTS

| 1,108,425 | 8/1914 | Brennan | 72—90 |
| 2,483,186 | 9/1949 | De Vellier | 72—88 |

FOREIGN PATENTS

| 20,703 | 11/1915 | Denmark | 248—19 |

RICHARD J. HERBST, Primary Examiner

U.S. Cl. X.R.

248—19